United States Patent
Benedetti et al.

[11] Patent Number: 5,201,623
[45] Date of Patent: Apr. 13, 1993

[54] TWO STAGE RIVET

[75] Inventors: Nicholas Benedetti, Macomb; Zdravko Kovac, Mt. Clemens, both of Mich.

[73] Assignee: Emhart Inc., Newark, Del.

[21] Appl. No.: 838,581

[22] Filed: Feb. 18, 1992

[51] Int. Cl.$^5$ .............................................. F16B 13/06
[52] U.S. Cl. ........................................... 411/48; 411/41
[58] Field of Search ....................... 411/45, 48, 49, 60, 411/41, 42, 72, 32, 33, 39, 40, 44, 51, 50, 53, 56, 57

[56] References Cited

U.S. PATENT DOCUMENTS

| | | | |
|---|---|---|---|
| 4,637,765 | 1/1987 | Omata | 411/45 X |
| 4,840,523 | 6/1989 | Oshida | 411/48 |
| 4,952,106 | 8/1990 | Kubogochi et al. | 411/48 |
| 5,085,545 | 2/1992 | Takahashi | 411/48 X |

FOREIGN PATENT DOCUMENTS 44-7768  4/1969  Japan ................................ 411/41

Primary Examiner—Rodney M. Lindsey
Attorney, Agent, or Firm—Spencer T. Smith

[57] ABSTRACT

A two stage rivet made up of a pin which can be pushed into a grommet. The pin has an enlarged central portion in which an annular groove is defined and recesses on either side of this enlarged portion. The recesses have a stepped configuration and the latches on the grommet have matched stepped surfaces.

2 Claims, 1 Drawing Sheet

TWO STAGE RIVET

BACKGROUND OF THE INVENTION

The present invention relates to two stage rivets which are used to releasably secure two parts together.

Two stage rivets are commonly used to secure or fasten parts to an automobile's framework. These rivets include a grommet which includes a head having a central hole and a plurality of rearwardly projecting legs which have an inwardly projecting catch at the end thereof. The rivet also includes a headed pin which has an enlarged central portion having an annular groove, recesses on either side of this central portion and a bulbous end. The pin is inserted into the central hole of the grommet and becomes located at a first position (the first stage) by the interconnection of these latches and the recess between the bulbous end and the enlarged central portion. In this condition the fastener can be inserted into a hole defined in two panels which are to be laminated. Once inserted, the pin is pushed further into the grommet until the head of the pin becomes flush with the head of the grommet.

At this second position (the second stage of the rivet) the latches on the legs are located in the annular groove of the enlarged central portion thereby forcing the forward ends of the legs outwardly forcefully clamping the laminated panels between the head of the grommet and the bent legs.

When the rivet is to be released the pin can be pushed in further (third stage) until the latches locate in the recess adjacent the head. The legs reassume their initial shape thereby allowing removal of the rivet.

Since the rivet is plastic the legs should return to their original position whenever the rivet is positioned at the first or third stages. But such return displacement is not instantaneous and as a result the pin can be separated from the grommet and this is very undesirable.

BRIEF SUMMARY OF THE INVENTION

It is accordingly an object of the present invention to provide a two stage rivet which will be more likely to remain together during removal.

Other objects and advantages of the present invention will become apparent from the following portion of this specification and from the accompanying drawings which illustrates in accordance with the mandate of the patent statutes a presently preferred embodiment incorporating the principles of the invention.

BRIEF DESCRIPTION OF THE DRAWINGS

Referring to the drawings.

DETAILED DESCRIPTION OF THE INVENTION

Figure 1:
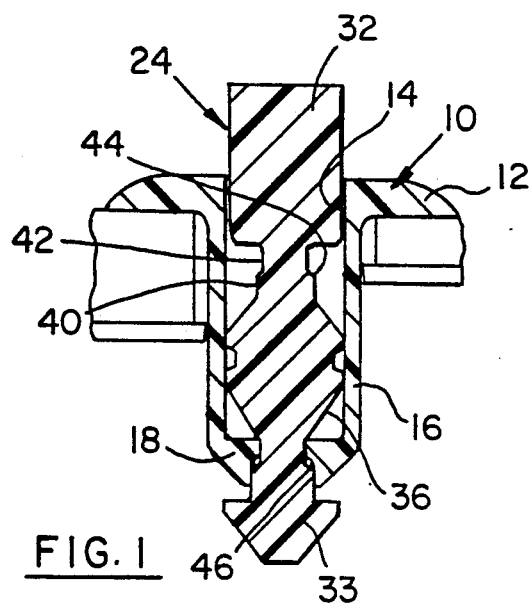
FIG. 1 is a cross sectional view of the two stage rivet made in accordance with the teachings of the present invention in the assembled condition.

The two stage rivet has a grommet 10 which includes a head 12 having a hole 14 extending therethrough and three legs 16 extending rearwardly from the rear side of the head 12. Each leg 16 extends about the inner diameter of the hole 14 and ends at the free end with a latch portion 18. The leg is curved (transversely to the axis of the rivet) so that it takes a substantial force to bend it outwardly. The outer diameter of these legs is selected so that the legs can be inserted into a corresponding hole 19 extending through a laminate of two elements 20, 22 which are to be secured together (the drawings illustrate a thin laminate on one side and a thick laminate on the other).

Figure 2:
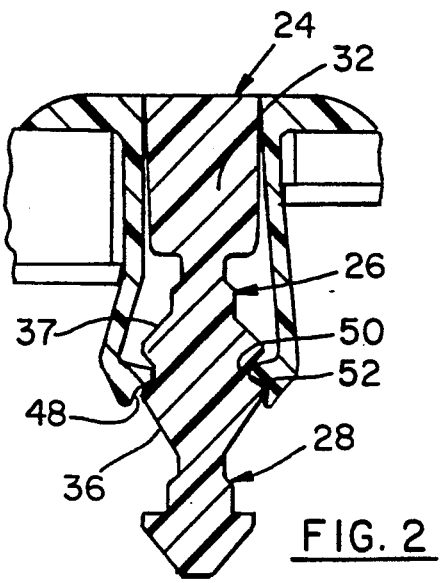
FIG. 2 is a view similar to the view of FIG. 1 with the rivet in use.
Figure 3:
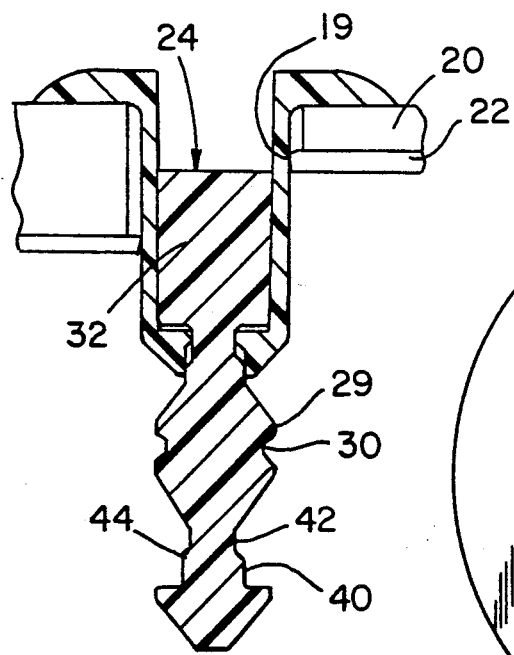
FIG. 3 is a view similar to FIG. 1 with the rivet in the release condition.
Figure 4:
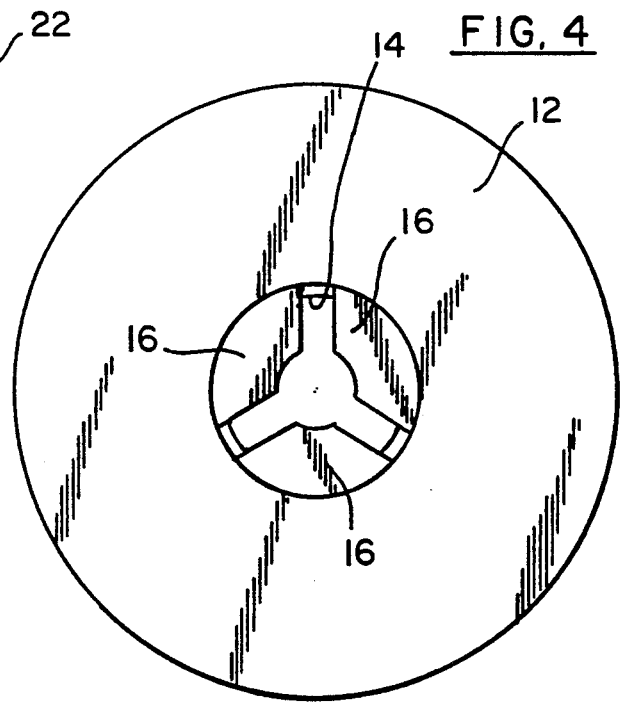
FIG. 4 is an end view of the two stage rivet.

The pin 24 of the assembly is cylindrical and has first 26 and second 28 reduced diameter portions (FIG. 2) on either side of an enlarged central portion 29 having an annular groove 30 (FIG. 3).

The pin 24 is pushed into the grommet 10 until the latches 18 of the grommet legs 16 locate against the first reduced diameter portion 26 (FIG. 1). Inadvertent removal is prevented by the bulbous opposite end 33. The legs are not flexed so the assembled two stage rivet can be inserted into the laminate hole 19. Once inserted, the head 32 of the pin can be pushed relative to the grommet head forcing the latches 18 along the annular camming surface 36 and then into the annular groove 30 (FIG. 2). This flexes the legs 16 and forces them against the inner edge of the laminate hole 19 to secure these laminates together. A wide range of laminate thicknesses can be secured in this way. To release the two stage rivet, the cylindrical head 32 of the pin is pushed into the grommet hole until the latches find the second reduced diameter area 28 (FIG. 3). This returns the legs 16 to their original position thereby allowing removal of the rivet. By pushing the pin of the removable two stage rivet in the opposite direction the latches will ride up the reverse cam surface 37, past the enlarged central portion 29 and back onto the forwardmost reduced diameter portion 26 so that the rivet can be used again.

The first 26 and second 28 recessed portions are stepped having a larger diameter portion 40 and a smaller diameter portion 42 connected by an annular bevel 44. The catch 18 of each leg has a matching stepped configuration 46 having a larger inner diameter surface 48 connected to a smaller inner diameter surface 50 by an annular bevel 52. This achieves a greater measure of interference with the pin to minimize the likelihood of separation when the pin is advanced to the release position while undermining the structural integrity of the recessed portions to the minimum extent.

We claim:

1. A two stage rivet comprising:
   a grommet having a head portion with a hole therein and a plurality of legs extending rearwardly from said head portion,
   each of said legs having an inwardly directed latch portion, and
   a cylindrical pin having a head at one end, a bulbous portion at the other, a central enlarged portion having an annular groove and first and second reduced diameter portions on either side of said enlarged central portion for receiving said latch portions while permitting said legs to be unflexed,
   said first reduced diameter portion being selectively located so that said pin and said grommet will be interconnected with the end of said head of said pin protruding beyond said grommet head portion when said latche portions are located in said first reduced diameter portion,
   said enlarged portion being selectively located so that said pin and said grommet will be interconnected with the end of the said head of said pin flush with said grommet head portion when said latch portions are located within said annular groove, said second reduced diameter portion being selectively located so that said pin and said grommet will be interconnected with the end of the head of said pin extending into said grommet head portion when said latche portions are located within said second reduced diameter portion whereby said rivet can be removed from the hole, said first and second reduced diameter portions having a first cylindrical portion and an adjacent second cylindrical portion having a diameter smaller than the diameter of said first cylindrical portion, conical surface means interconnecting said first and second reduced diameter portions with said central enlarged portion, and said latch portions defining when located within said first or second reduced diameter portions first cylindrical surface means for engaging said first cylindrical portion of said first and second reduced diameter portions and second cylindrical surface means for engaging said second cylindrical portion of said first and second reduced diameter portions.

2. A two stage rivet according to claim 1 wherein said grommet includes three legs.

* * * * *